May 12, 1959   P. A. COFFMAN, JR., ET AL   2,886,302
SCALE BEAM SENSITIVITY CONTROL
Filed Oct. 24, 1956
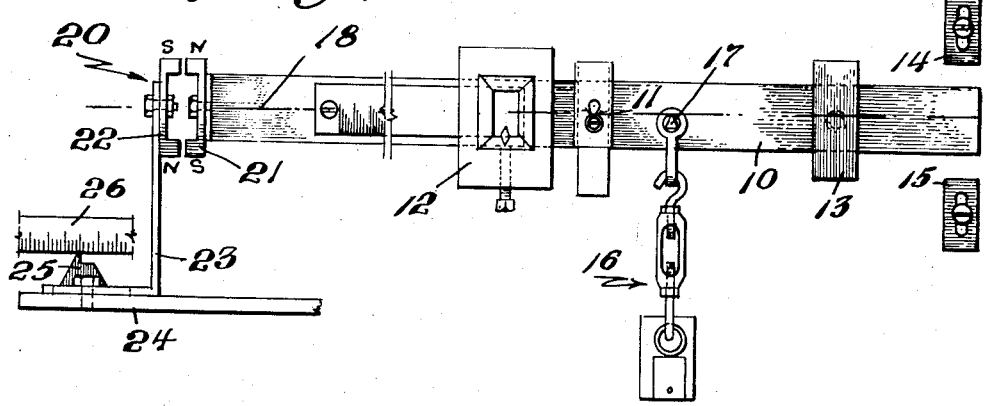
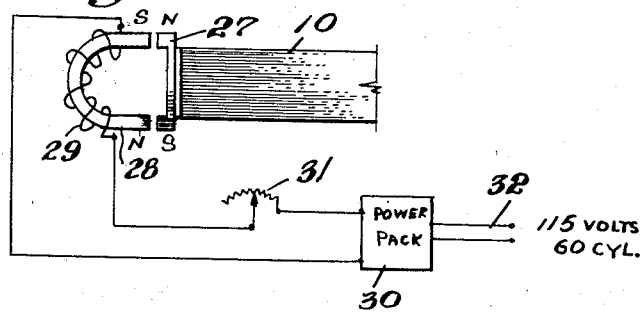
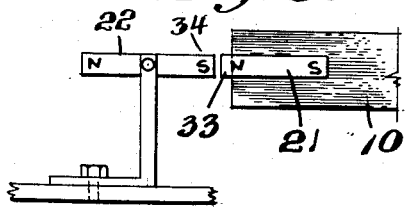
INVENTORS
Paul A. Coffman, Jr.
Lyndus E. Harper
BY
Barlow & Barlow
ATTORNEYS.

2,886,302
SCALE BEAM SENSITIVITY CONTROL

Paul A. Coffman, Jr., Warwick, and Lyndus E. Harper, West Barrington, R.I., assignors to B-I-F Industries, Inc., a corporation of Rhode Island Application October 24, 1956, Serial No. 618,035

3 Claims. (Cl. 265—49)

This invention relates to a means for varying the sensitivity of a weighing scale such as might be applied to gravimetric feeders or other weighing machines or apparatus.

Attempts have heretofore been made for adjusting the sensitivity of a scale beam so that it will perform a function comparable to pneumatic or electronic controllers. One method of attempting to accomplish this greater sensitivity included the addition of pendulum weights hanging from the fulcrum of a conventional scale beam. Such a pendulum weight, however, introduced additional inertia in the system with the adverse effects of the beam being slower to move to a new position indicating a change in the scale load and also the scale beam moving past the position it should assume to indicate the amount of change in the weight, both of which were bad for control purposes. Another method of accomplishing a closer sensitivity was that of raising and lowering the center of gravity of the scale beam and counter poise weight. This, however, required complicated and expensive mechanism which was not justified.

One of the objects of this invention is to overcome the difficulties presented in the above mentioned methods of proceeding to accomplish a more sensitive control.

Another object of this invention is to accommodate the change of inertia caused by change in load on the scale and in position of the poise on the beam.

With these and other objects in view, the invention consists of certain novel features of construction as will be more fully described and particularly pointed out in the appended claims.

In the accompanying drawings:

Figure 1 is a diagrammatic view illustrating a scale beam with one form of magnetic control at the end thereof;

Figures 2 and 3 are fragmental views showing the end of a scale beam and modified magnetic controls at the end thereof.

In order to provide a more sensitive control without the accompanying drawbacks of the systems above mentioned, we have provided magnetic means at the end of the scale beam which is centered on the null balance point on a center line through the scale beam and provided for a variation of this magnetic field in order to provide the sensitivity of the scale beam desired.

With reference to the drawings, scale beam 10 is fulcrumed at 11 with a counter poise 12 on one side of the fulcrum and a tare adjustment weight 13 on the other side of the fulcrum. Stops 14 and 15 are provided to limit the movement of the scale beam about the pivot. A load connector designated generally 16 is attached to the scale beam as at 17 and provides a connection to the usual lever system and balance weights of a weighing apparatus. The center line 18 of the scale beam will pass through the fulcrum and the center of mass of the beam and its weights 12 and 13.

We provide a magnetic means designated generally 20 at the end of the scale beam 10 which comprises a part 21 carried by the end of the scale beam and centralized with reference to its center line on the null balance line of the scale beam. A part 22 is spaced from the end of the scale beam and is mounted upon a bracket 23 slidable upon a support 24 to be adjusted toward and from the end of the scale beam along the support 24 so that its pointer 25 may be located at various points along the scale 26. The part 22 will be also centered on the null balance line of the beam and is a fixed magnet having a north pole and a south pole as indicated by the letters N and S. The part 21 may or may not be a magnet; but if a magnet, then it will be arranged so that its north and south pole will be opposite to the north and south poles of part 22 as shown by the letters N and S thereon. By this arrangement of magnets, a magnetic field is created so that there is a flow of magnetic flux from north to south pole, and a magnetic path is provided through the air gaps and parts 21, 22. The reluctance of this path and consequently the strength of magnetic flux across the air gaps will vary with the distance that the parts 21 and 22 are spaced from each other.

In Figure 2 we have illustrated the magnetic path as comprising a part 27 attached to the end of beam 10 and a portion 28 which is a horseshoe shaped core having a winding 29 that is energized by a power pack 30 from some suitable source of power designated 32 and controlled by rheostat 31. The strength of the magnetic flux passing between the parts 27 and 28 in this instance will depend upon the amount of current flowing through the coil of the electromagnet 29 which is controlled by the rheostat 31. In this case the part 27 need not be polarized; but if polarized, will be polarized in a manner similar to that above described where the north and south poles are as indicated by the N and S of the drawings. Likewise, the polarity of the electromagnet will be as shown by the N and S in the sketch, and these polarities will be opposite as thereshown.

It will also be apparent that it is not necessary that there be two poles on part 21 or two poles on the part 22 which co-operates therewith. Thus we may use a single pole 33 on the part 21 and an opposite pole 34 on the part 22 to co-operate therewith as illustrated in Figure 3.

The strength of the magnetic field may be adjusted to Figures 1 or 3 by varying the distance between parts 21 and 22 of the magnet, while it may be adjusted in Figure 2 by the rheostat 31 varying the current flow through the coil of the electromagnet 29.

The magnetic field has the effect of urging the beam toward the null or balance position. Any change of the load on the scale will, of course, deflect the beam away from the null position. When this occurs, the vertical vector of the attractive force between the poles of magnet 22 and magnet 21 (Figure 1) will increase substantially in proportion to the amount of deflection.

It is often desired to utilize the deflection of the scale beam to operate a controller for effecting a change in the load on the scale. The sensitivity adjustment provided by the magnets 21 and 22 is particularly useful in such instances.

For example, suppose that the controller will produce its full effect when the scale beam deflection is ½ inch in either direction. Suppose also that the full controller effect is desired when the error in load is large, say 4 pounds. Then the magnet 22 would be adjusted close to magnet 21 so as to permit ½ inch deflection of the beam with the 4-pound increment of load.

On the other hand, suppose that the full controller effect is desired when the error in load is small, say 4 ounces. Then the magnet 22 would be adjusted away from magnet 21 so as to permit ½ inch deflection of the beam with the 4-ounce increment of load.

Thus by means of varying the relative positions of the magnets, we may adjust the sensitivity of the scale beam for any departure in actual weight on the scale.

By the use of two magnets such as illustrated in Figure 1, an increased effect is provided when the beam swings above or below the null position; for, as the north pole of the part 21 approaches the north pole of the part 22, there will be a repelling action between these two poles; or should the beam move upwardly at the left hand end, then there will be a repelling action between the two south poles as they approach each other.

It will also be apparent that it is not necessary that the magnetic field be located directly at the end of the beam as it may be at one side of the beam on one side of the pivot.

By having the magnetic field as shown and described above, the fulcrum may be located on the exact center of mass of the beam and its weights and yet the sensitivity desired may be provided which will enable optimum beam movement to be used.

We claim:

1. In combination with a weighing scale having a support, a beam balance, a fulcrum mounting the beam for pivotal movement relative to the support, magnetic field producing means affixed to one end of said beam, second magnetic field producing means affixed to said support and mounted adjacent said first means, said means oriented so that the maximum strength lines of flux are centered on a line passing through the beam pivot and the null balance point of said beam, an attractive force being produced between said means whereby the movement of said beam may be damped.

2. The combination of claim 1 wherein said second means may be moved on said support relative to said end of said beam whereby the sensitivity of the damping action may be controlled.

3. The combination of claim 1 wherein at least one of said means is an electromagnetic structure and has included in circuit therewith means to vary the current to said electromagnetic structure whereby the sensitivity of the damping action may be controlled.

References Cited in the file of this patent

UNITED STATES PATENTS

| | | |
|---|---|---|
| 1,881,060 | Okey | Oct. 4, 1932 |
| 2,279,076 | Sutton | Apr. 7, 1942 |
| 2,448,477 | Wasko et al. | Aug. 31, 1948 |

FOREIGN PATENTS

| | | |
|---|---|---|
| 215,566 | Germany | Dec. 25, 1908 |
| 601,083 | Great Britain | Apr. 27, 1948 |
| 994,287 | France | Aug. 8, 1951 |